United States Patent [19]

Gauge

[11] Patent Number: 4,480,437
[45] Date of Patent: Nov. 6, 1984

[54] UNFOLDABLE DEVICE FOR EXTENDING THE NOZZLE OF A ROCKET ENGINE

[75] Inventor: Paul D. Gauge, Cesson, France

[73] Assignee: Centre National d'Etudes Spatiales, Paris, France

[21] Appl. No.: 474,060

[22] Filed: Mar. 10, 1983

[30] Foreign Application Priority Data

Mar. 17, 1982 [FR] France ............................ 82 04508

[51] Int. Cl.³ ............................................. F02K 9/97
[52] U.S. Cl. .................................. 60/271; 239/265.43
[58] Field of Search ............... 60/242, 271; 239/127.1, 239/265.43, 533.13

[56] References Cited

U.S. PATENT DOCUMENTS 3,346,186 10/1967 Fulton et al. .................. 239/265.43
3,482,783 12/1969 Nebiker et al. ....................... 60/271
3,559,741 2/1971 Levy ............................... 239/265.43
3,596,465 8/1971 Pryor et al. ........................... 60/271

FOREIGN PATENT DOCUMENTS 1414824 9/1965 France.
1419313 10/1965 France.

Primary Examiner—Louis J. Casaregola
Attorney, Agent, or Firm—Stevens, Davis, Miller & Mosher

[57] ABSTRACT

The device consists of a frustoconical-shaped skirt formed by a stack of tube rings or coils welded to one another. The tube has a cross-section flattened in the direction of the stack and incorporates on the inside a pyrotechnic device. The pyrotechnic device generates sufficient pressure to increase the dimension of the tube in the direction of the stack. The effect of this pressure is to unfold the nozzle extension.

6 Claims, 4 Drawing Figures

UNFOLDABLE DEVICE FOR EXTENDING THE NOZZLE OF A ROCKET ENGINE

The invention relates to an unfoldable device for extending the nozzle of a rocket engine equipping, among other things, the intermediate stages of a launcher.

The specific propulsion momentum (SPM) of a rocket engine in a vacuum is a function of the expansion ratio of its nozzle, that is to say of the ratio of the cross-sectional outlet surface to the cross-sectional surface at the neck. Thus, all other things being equal, the SPM increases with the expansion ratio.

Since the shape of the nozzle is governed by aerodynamic considerations and varies only very slightly, the SPM increases with the length of the nozzle. Any gain in the SPM results in a mass gain in respect of the useful load.

In actual fact, a compromise must be found between the outlet cross-section, which is intended to be as large as possible, and the correlative increases in mass which subtract from the possible gains as regards the useful load, these increases in mass being attributed to the increase in length of the diffuser nozzle and of the encasing structures between the stages of a launcher.

In order to limit the height necessary for accommodating the engine between stages of a launcher, there has been a tendency towards devices capable of providing the desired expansion ratio, after the separation of the lower stage, as a result of the displacement of one or more frustoconical rings or the installation of split walls round the nozzle. These systems are generally controlled by means of subsidiary power sources: electrical, hydraulic or the like.

According to an embodiment described in the Journal of Spacecraft, Volume 9, No. 7, July 1972, pages 485 and 486, the extension consists of a metal sheet folded in the form of a V and fastened externally to the nozzle via the end of one branch to the V, the aperture of the V being oriented in the opening direction of the nozzle. A cover made of rubber-coated nylon fabric is fastened to the periphery formed by the second branch of the V. After the separation of the lower stage, the extension is unfolded by putting the nozzle under pressure (of the order of 0.1 Mpa). The cover is separated by rupturing the ring or fastening cable by means of an explosive. The resulting three-dimensional deformation produces a rigid final structure which does not require additional supports to withstand the thrust and the dynamic loads.

The extension can be cooled only by radiation when the nozzle is in operation, and this determines a quality of material compatible with the temperature of the jet, this temperature being all the higher because the fixed part of the nozzle will be shorter. To fold the extension back onto the fixed nozzle, it is necessary that the latter should not support any secondary nozzle, and consequently the device cannot be used for a branched-flow nozzle.

The unfoldable nozzle-extension device according to the invention is located at the end of the fixed nozzle and can, if appropriate, be cooled by the cooling fluid circulating in the skirt of the nozzle.

The explanations and Figures given below by way of example will make it possible to understand how the invention can be put into practise.

Figure 3:
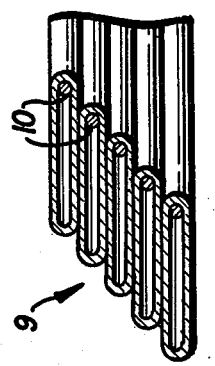
FIG. 3 is a view, on a larger scale, of the detail III in FIG. 1.
Figure 2:
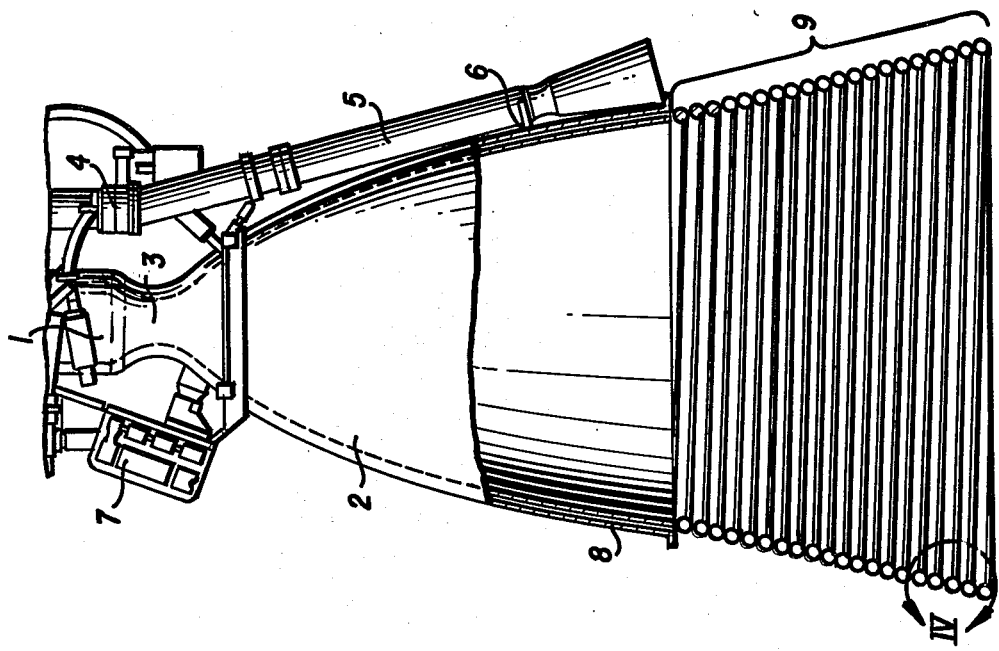
FIG. 2 is the same view as in FIG. 1, the device being in the unfolded position.
Figure 1:
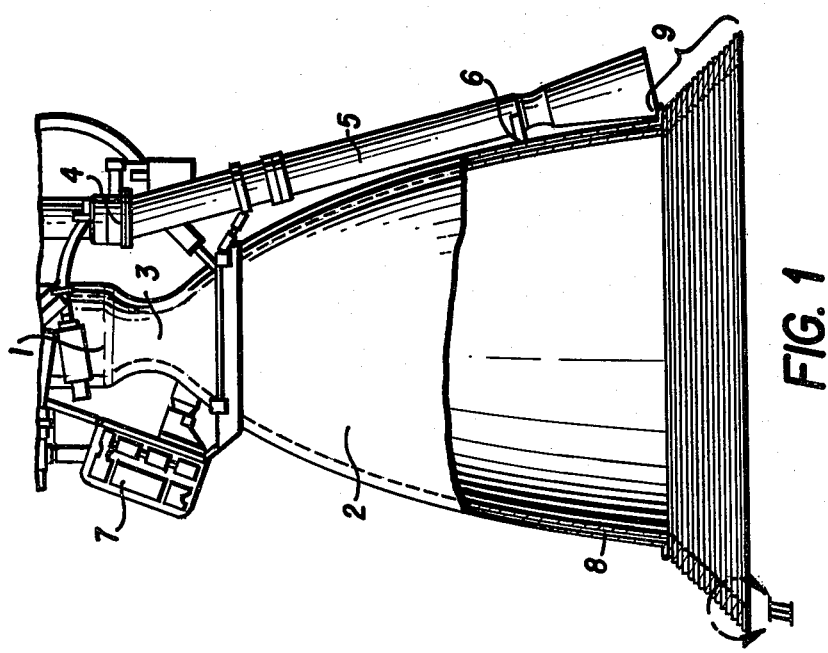
FIG. 1 shows a partially sectional view of a nozzle equipped with a device according to the invention, in the folded-up position.

FIGS. 1 and 2 show a branched-flow rocket engine. The combustion chamber 1 communicates with the main nozzle 2 via a constricted portion or neck 3. The outlet of the turbo-pump 4 is prolonged by a nozzle 5 which is fastened to at least one point 6 of the main nozzle. A device 7 for cooling the combustion chamber 1 and the skirt 8 of the main nozzle is provided near the neck of the engine. The extension device 9 for the main nozzle 2, according to the invention, takes the form, externally, of a frustoconical skirt formed by a stack of tube rings or coils welded to one another approximately along one of their generating lines. When the device is in the folded-up position (FIG. 1), the tube has a cross-section flattened in the direction of the stack, the form being, for example, that of an ellipse or, as shown in FIG. 3, an elongated rectangle, the short sides of which are rounded.

Figure 4:
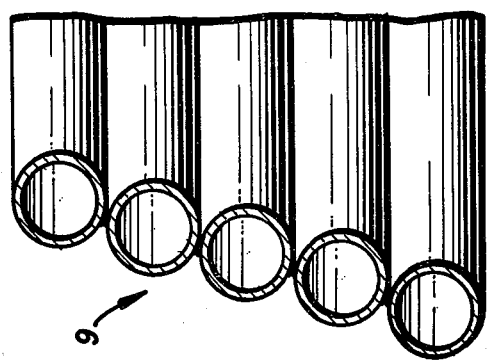
FIG. 4 is a view, on a larger scale, of the detail IV in FIG. 2.

The tube or tubes incorporate on the inside a pyrotechnic device, for example a detonating fuse 10, connected to an ignition device controlled by the stage separation. As a result of the formation of gas, ignition of the fuse causes a sufficient increase in pressure in the tube for it to inflate and assume an approximately circular shape, as shown in FIG. 4. Because of the change in shape of the tubes forming the coils or the rings, and especially because of their increase in dimension in the direction of the stack, the extension unfolds, as shown in FIG. 2, and the surface of the tubes which forms the interior provides a continuation of the inner wall of the nozzle.

According to a first embodiment, the extension is formed from a continuous tube would helically in adjoining coils, the coils being welded to one another along two approximately diametrically opposite generating lines. The detonating fuse is located in the tube over its entire length and generally only has one ignition point.

According to a second embodiment, the extension is formed from several tubes which are arranged side by side and are wound in adjoining coils along spirals more or less close together. Each tube is then provided with a detonating fuse, all the fuses being connected to the same ignition device.

In the preceding embodiments, it is possible, once the extension has been unfolded, either to maintain the tube or tubes under pressure, cooling taking place as a result of radiation, or to provide a connection to the cooling outlet of the fixed skirt of the nozzle, cooling taking place as a result of the circulation of cryogenic fluid. The connection between the extension and the fixed skirt and, if appropriate, to the outside atmosphere, before and during unfolding, is interrupted by shut-off devices: valves or flaps.

According to a third embodiment, the extension consists of a stack of rings which are each provided with a detonating fuse. These fuses are connected in a known way to an ignition device. Only cooling by radiation is suitable for this embodiment.

Various methods of production are capable of providing an extension device according to the invention.

A tube of circular cross-section is wound in adjoining coils on a mandrel, and the coils are welded to one another. The detonating fuse is put in place, and the tube is put under pressure. According to known methods, the assembly is subsequently compressed so as to reduce the height of the extension in the desired ratio. The device is subsequently fastened to the nozzle skirt.

The same method of production applies to a stack of rings.

According to another method, the starting-point is a tube of flattened cross-section which is wound and welded. The compression operation is then omitted.

According to an exemplary embodiment, a tube of stainless steel having a circular cross-section, a diameter of 10 mm and a thickness of 0.1 mm is used. By compressing the assembly the thickness of a spiral is changed from 10 mm to approximately 2 mm, and in this way the total length of the extension device changes from 800 mm to 160 mm, that is to say a ratio of 1/5.

The device is then fastened to the periphery of the fixed skirt of the nozzle, and the cooling outlets are, if appropriate, connected. Releasable retaining means, which are intended to prevent any displacement attributed to vibrations during the launching phase, are placed on the lower edge of the frustoconical skirt of the device. These means are released during separation of the lower stage. The pyrotechnic device, when ignited, generates sufficient pressure to give the tubes their circular shape and thus unfold the device.

Elongation of the nozzle makes it possible to change the passage cross-section from 60 to 130, and, in spite of the increase in mass of the engine of the order of 15 kg, this allows a significant increase in the useful load.

I claim:

1. An unfoldable device for extending the nozzle of a rocket engine, intended especially for equipping the intermediate stages of a launcher, which consists of a frustoconical skirt formed by a stack of tube rings or coils welded to one another, the said tube rings or coils having a cross-section flattened in the direction of the stack, and of a pyrotechnic device accommodated in the tube and capable of generating, when ignited, sufficient pressure to increase the dimension of the tube in the direction of the stack.

2. The device as claimed in claim 1, wherein the skirt is formed by at least one continuous tube wound helically in adjoining coils, the coils being welded to one another along two approximately diametrically opposite generating lines.

3. The device as claimed in claim 2, wherein the tube has a cross-section of elliptical shape.

4. The device as claimed in claim 2, wherein the tube has a cross-section in the form of an elongated rectangle, the short sides of which are rounded.

5. The device as claimed in claim 2, wherein the tube or tubes forming the frustoconical skirt incorporate at least one connection to an outlet of the nozzle of the rocket engine.

6. The device as claimed in claim 5, wherein the connection or connections incorporate a shut-off device which isolates the tube or tubes at least during the ignition of the pyrotechnic device.

* * * * *